(12) United States Patent
Jahn

(10) Patent No.: US 7,828,066 B2
(45) Date of Patent: Nov. 9, 2010

(54) MAGNETIC MOTOR SHAFT COUPLINGS FOR WELLBORE APPLICATIONS

(75) Inventor: Robert Jahn, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 50 days.

(21) Appl. No.: 12/274,922

(22) Filed: Nov. 20, 2008

(65) Prior Publication Data

US 2009/0194284 A1 Aug. 6, 2009

Related U.S. Application Data

(60) Provisional application No. 60/991,151, filed on Nov. 29, 2007.

(51) Int. Cl.
*E21B 47/00* (2006.01)
(52) U.S. Cl. .................. 166/383; 166/66.5; 166/217
(58) Field of Classification Search .............. 166/381, 166/382, 66, 217, 66.5
See application file for complete search history.

(56) References Cited

U.S. PATENT DOCUMENTS

| | | | |
|---|---|---|---|
| 4,031,750 A | 6/1977 | Youmans et al. | |
| 5,060,751 A | 10/1991 | Kuhlman et al. | |
| 6,009,943 A | 1/2000 | Yokley et al. | |
| 6,488,104 B1 | 12/2002 | Eppink et al. | |
| 6,494,272 B1 | 12/2002 | Eppink et al. | |
| 7,252,143 B2 | 8/2007 | Sellers et al. | |
| 7,505,010 B2* | 3/2009 | Franzon et al. | 343/757 |
| 2003/0024702 A1* | 2/2003 | Gray et al. | 166/301 |
| 2003/0132003 A1* | 7/2003 | Arauz et al. | 166/370 |
| 2008/0196890 A1* | 8/2008 | Fout et al. | 166/250.15 |

* cited by examiner

*Primary Examiner*—William P Neuder
(74) *Attorney, Agent, or Firm*—Cantor Colburn LLP

(57) ABSTRACT

An actuator for operating downhole tools includes a tool body and one or more members configured to perform a wellbore task. The tool may include a sealed power and a driven section in pressure communication with the wellbore. A magnetic coupling magnetically connects the power section to the driven section. The power section may include an electric motor; and the driven section may include a speed reducer/torque increaser. In some embodiments, the member may be a positioning member. The positioning member may be manipulated to position a sensor that is configured to measure a parameter of interest. In other embodiments, the member may be an element such as cutting elements that cut wellbore tubulars. In aspects, a method for actuating or operating downhole tools includes using an actuator that utilizes a magnetic coupling to convey energy across a pressure boundary.

19 Claims, 7 Drawing Sheets

MAGNETIC MOTOR SHAFT COUPLINGS FOR WELLBORE APPLICATIONS

CROSS-REFERENCE TO RELATED APPLICATIONS

This application takes priority from U.S. Provisional Application Ser. No. 60/991,151, file Nov. 29, 2007.

BACKGROUND OF THE DISCLOSURE

1. Field of the Disclosure

The disclosure relates generally to systems and methods for actuating downhole tooling.

2. Description of the Related Art

Oil or gas wells are often surveyed to determine one or more geological, petrophysical, geophysical, and well production properties ("parameters of interest") using electronic measuring instruments conveyed into a wellbore by an umbilical such as a wireline, slickline, drill pipe or coiled tubing. Tools adapted to perform such surveys are commonly referred to as formation evaluation tools. These tools may use mechanical, electrical, acoustical, nuclear and/or magnetic energy to stimulate the formations and fluids within the wellbore and measure the response of the formations and fluids. The measurements made by downhole instruments are transmitted back to the surface. In many instances, these tools may have to be oriented in a pre-determined position in order to obtain accurate measurements. Exemplary positions may include a concentric position in a wellbore, an eccentric position in the wellbore, and an abutting or contacting relationship between the tool and a wall of the wellbore.

The present disclosure addresses the need for actuator systems suitable for such tools as well as actuator systems that address other needs of the prior art.

SUMMARY OF THE DISCLOSURE

In aspects, the present disclosure provides an actuator that permits power sources, such as electric motors, to operate at lower temperatures and deliver power at sufficient magnitude to perform useful work even in high pressure and high temperature wellbore environments.

In embodiments, the apparatus includes a tool body and one or more one positioning members associated with the tool body. The positioning member or members may be configured to engage a surface associated with the wellbore. For example, a positioning member may include an arm configured to radially extend and retract. The apparatus further includes an actuator operably coupled to each positioning member. The actuator may have a power section, a driven section, and a magnetic coupling magnetically connecting the power section to the driven section. In one arrangement, the power section includes a sealed chamber and the driven section includes a chamber in pressure communication with the wellbore. The power section may include an electric motor; and the driven section may include a speed reducer/torque increaser. In embodiments, the apparatus may include a sensor that is configured to measure a parameter of interest. The sensor may be positioned in the tool body and/or on a positioning member.

In other embodiments, the apparatus may be configured to rotate one or more elements that perform tasks by engaging or contacting a wellbore object such as a wellbore wall or a wall of a wellbore tubular. For example, the elements may be cutting elements that are configured to cut into objects such as metal casings or drill string. An apparatus configured for such tasks may include a sealed motor section, a driven section, and a magnetic coupling magnetically connecting the power section to the driven section. In one arrangement, the sealed motor section includes a motor in a sealed chamber and the driven section may be positioned in a chamber in pressure communication with the wellbore. The rotary power of the motor is transferred across a pressure boundary between the sealed motor section and the driven section to rotate the cutting elements.

In aspects, the present disclosure provides a method for actuating or operating downhole tools by using an actuator that utilizes a magnetic coupling that permits a motor to operate at lower temperatures and to deliver power to perform useful work in high pressure and high temperature wellbore environments.

It should be understood that examples of certain features of the disclosure have been summarized broadly in order that detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

The advantages and further aspects of the disclosure will be readily appreciated by those of ordinary skill in the art as the same becomes better understood by reference to the following detailed description when considered in conjunction with the accompanying drawings in which like reference characters designate like or similar elements throughout the several figures of the drawing and wherein.

DETAILED DESCRIPTION OF THE PREFERRED EMBODIMENTS

Figure 1:
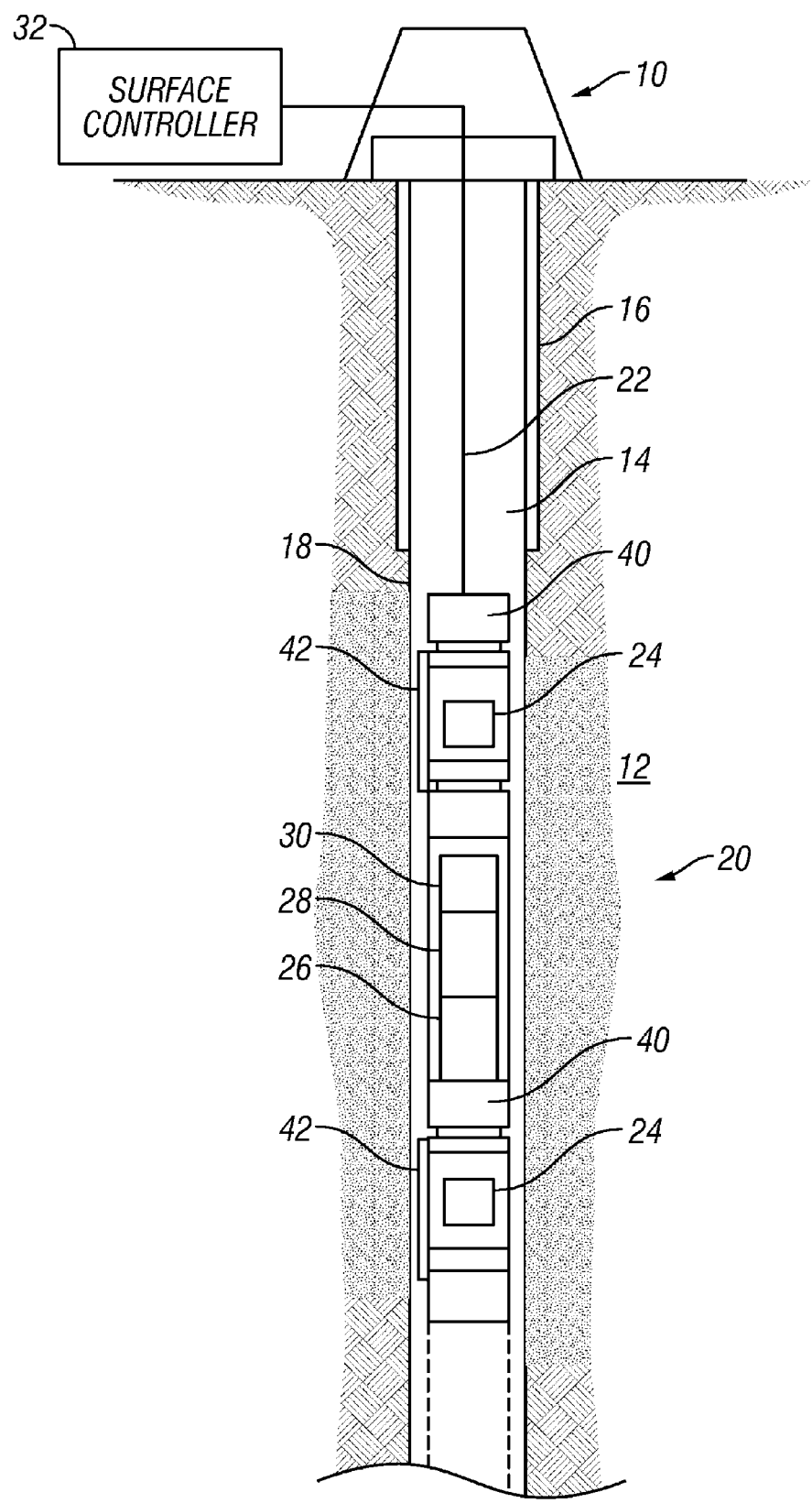
FIG. 1 is a schematic elevation view of an exemplary well that is being investigated with a formation evaluation tool configured in accordance with one embodiment of the present disclosure.

The present disclosure relates to devices and methods for actuating downhole tooling. The present disclosure is susceptible to embodiments of different forms. There are shown in the drawings, and herein will be described in detail, specific embodiments of the present disclosure with the understanding that the present disclosure is to be considered an exemplification of the principles of the disclosure and is not intended to limit the disclosure to that illustrated and described herein. Further, while embodiments may be described as having one or more features or a combination of two or more features, such a feature or a combination of features should not be construed as essential unless expressly stated as essential.

As will be discussed in greater detail below, embodiments of the present disclosure enable a power source in a first pressure environment to transmit power to a driven unit in a second pressure environment without the use of seals along the power transmission path. In many, but not all embodiments, the power transmission path will be configured to transmit rotary power. However, in certain embodiments, a translation motion or other motion may also be utilized to transmit power. The driven unit converts the power supplied by the power source into a mechanical action that can be used to apply a force to a wellbore or casing wall. The applied force may be used to move, position, displace, anchor, steer or orient a tool or housing in a wellbore. Exemplary embodiments are described below.

Referring initially to FIG. 1, there is shown a rig 10 on the surface that is positioned over a subterranean formation of interest 12. The rig 10 can be a part of a land or offshore a well production/construction facility. A wellbore 14 formed below the rig 10 includes a cased portion 16 and an open hole portion 18. In certain instances (e.g., during drilling, completion, work-over, etc.), a logging operation may be conducted to collect information relating to the formation 12 and the wellbore 14. Typically, a tool assembly 20 is conveyed downhole via an umbilical 22 to measure one or more parameters of interest relating to the wellbore 14 and/or the formation 12. The term "umbilical" as used hereinafter includes a cable, a wireline, slickline, drill pipe, coiled tubing and other devices suitable for conveying a tool into a wellbore. The tool assembly 20 can include one or more tools 24 adapted to perform one or more downhole tasks. The tools may be positioned in a sonde or sub that is suited to enclose, house, or otherwise support a device that is to be deployed into a wellbore. While two proximally positioned tools 24 are shown, it should be understood that a greater or fewer number may be used.

In embodiments, the tool 24 may be formation evaluation tool adapted to measure one or more parameters of interest relating to the formation or wellbore. It should be understood that the term formation evaluation tool encompasses measurement devices, sensors, and other like devices that, actively or passively, collect data about the various characteristics of the formation, directional sensors for providing information about the tool orientation and direction of movement, formation testing sensors for providing information about the characteristics of the reservoir fluid and for evaluating the reservoir conditions. The formation evaluation sensors may include resistivity sensors for determining the formation resistivity, dielectric constant and the presence or absence of hydrocarbons, acoustic sensors or receivers for determining the acoustic porosity of the formation and the bed boundary in formation, nuclear sensors for determining the formation density, nuclear porosity and certain rock characteristics, nuclear magnetic resonance sensors for determining the porosity and other petrophysical characteristics of the formation. The direction and position sensors preferably include a combination of one or more accelerometers and one or more gyroscopes or magnetometers. The accelerometers preferably provide measurements along three axes. The formation testing sensors collect formation fluid samples and determine the properties of the formation fluid, which include physical properties and chemical properties. Pressure measurements of the formation provide information about the reservoir characteristics. The above-listed sensors and parameters should be considered illustrative and not exhaustive of the types of sensors that may be used in the tool 20 and or the parameters measured by the tool 20.

In certain embodiments, the tool assembly 20 can include communication equipment 26, a local or downhole controller 28 and a downhole power supply 30. The communication equipment 26 provides two-way communication for exchanging data signals between a surface controller 32 and the tool assembly 20 as well as for transmitting control signals from the surface processor 32 to the tool assembly 20. It should be appreciated that the above-described components and equipment merely illustrate one arrangement that may utilize the teachings of the present disclosure. The above-described components or equipment, therefore, are considered only optional and not necessary to the present teachings.

In accordance with one embodiment of the present disclosure, the tool assembly 20 may include an actuator assembly 40 that extend and/or retract one or more positioning members 42 on the tool 24. The members 42 may be adapted to independently move between an extended position and a retracted position. The extended position can be either a fixed distance or an adjustable distance. Suitable positioning members 42 include ribs, pads, pistons, cams, arms or other devices adapted to engage a surface such as a wellbore wall or casing interior. In certain embodiments, the positioning members 42 may be configured to temporarily lock or anchor the tool 20 in a fixed position relative to the wellbore and/or allow the tool 20 to move along the wellbore. The actuator assembly 40 and the members 42 may be configured to provide a fixed or adjustable amount of force against the wellbore wall. For instance, in a positioning mode, the members 42 may position the tool 20 in a selected radial alignment or position relative to a wellbore wall or an axial centerline of the wellbore. The force applied to the wellbore wall during that mode, however, is not so great as to prevent the tool from being moved along the wellbore. In a locking or anchoring mode, the members 42 may generate a sufficiently high frictional force on the wellbore wall as to prevent substantial relative movement between the wellbore wall and the tool 20. In certain embodiments, a biasing member (not shown) can be used to maintain the positioning members 42 in a pre-determined reference position.

In embodiments, the actuator 40 may utilize a power section that generates power and a driven section that actuates the positioning member or members 42. As will be described in greater detail below, the power section may be positioned in a sealed chamber at controlled pressure, such as atmospheric pressure. The driven section for conveying the power from the electric motor to the positioning members 42, however, may be positioned in a chamber that is substantially at an ambient wellbore pressure. Advantageously, a magnetic coupling positioned at a bulkhead or other physical interface between the controlled pressure and the ambient wellbore pressure may be used to transmit rotary power from the power section to the driven section.

Figure 2:
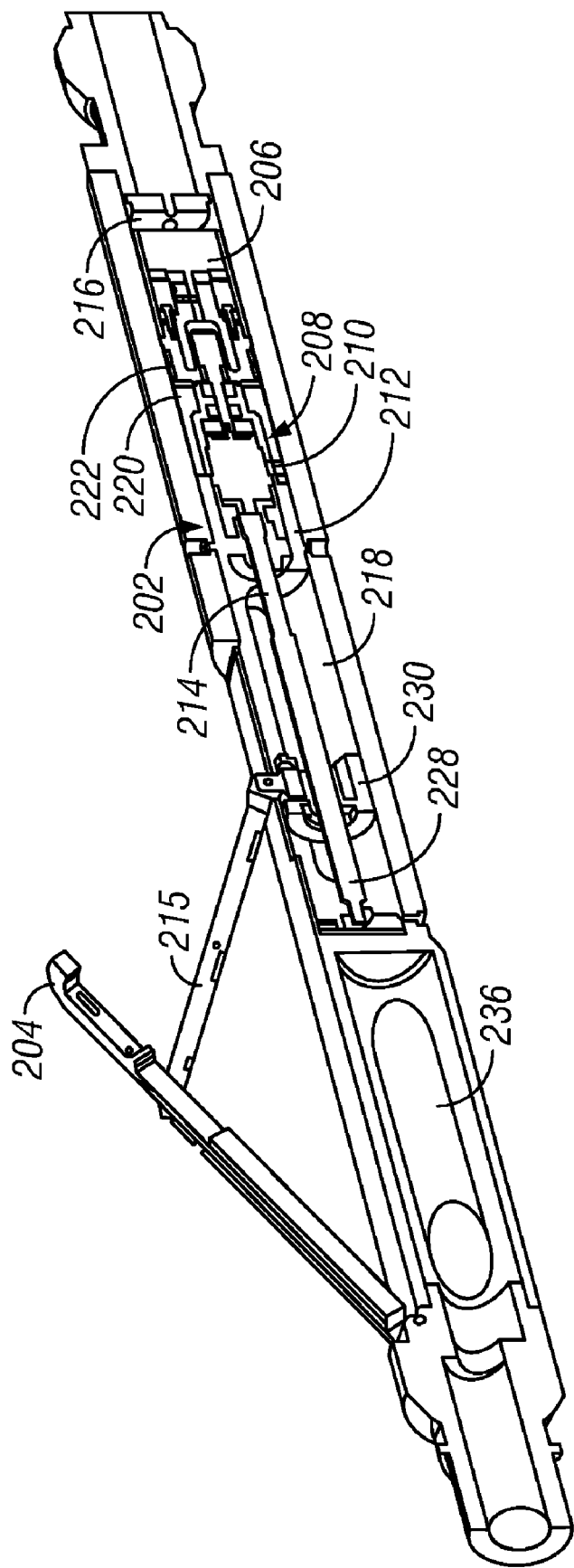
FIG. 2 is an isometric view of a formation evaluation tool using a magnetic coupling in accordance with one embodiment of the present disclosure.

Referring now to FIG. 2, there is shown in greater detail one exemplary formation evaluation tool assembly 200 made according to the present disclosure. The formation evaluation tool assembly 200 may include an actuator 202 for selectively extending and/or retracting one or more arms 204. The actuator 202 may include an electric motor 206 that drives a drive train 208. The drive train 208 may include a speed reducer/torque increaser 210, one or more thrust bearings 212 and a shaft 214. In embodiments, the arm 204 is extended and retracted using a mechanical linkage 215. For instance, the shaft 214 may include a threaded section 228 on which is mounted a ball nut 230. Rotation of the shaft 214 causes the ball screw 230 to translate linearly along the shaft 214. The linear motion of the ball screw 230 causes linkage 215 to extend or retract the arm 204 in a known manner.

It should be understood that the drive train 208 may also utilize other power transmission mechanisms. For example, the drive train 208 may utilize cams that may extend or retract pads.

In one arrangement, the tool assembly 200 may include a sealed section 216 that is maintained at substantially atmospheric pressure and a high pressure section 218 that may have a pressure that approximates a pressure in a surrounding wellbore. Disposed within the sealed section 216 is the electric motor 206. Disposed within the high pressure section 218 is the drive train 208. The sealed section 216 and the high pressure section 218 may be separated by a pressure bulkhead 220. A magnetic coupling 222 may be used to transmit rotary power across the bulkhead 220. In embodiments, the magnetic coupling 222 magnetically couples the rotating shaft of the electric motor 206 to the drive train 208 to thereby allow the transmission of rotary power without a physical connection between the electric motor 206 and the drive train 208.

Figure 3:
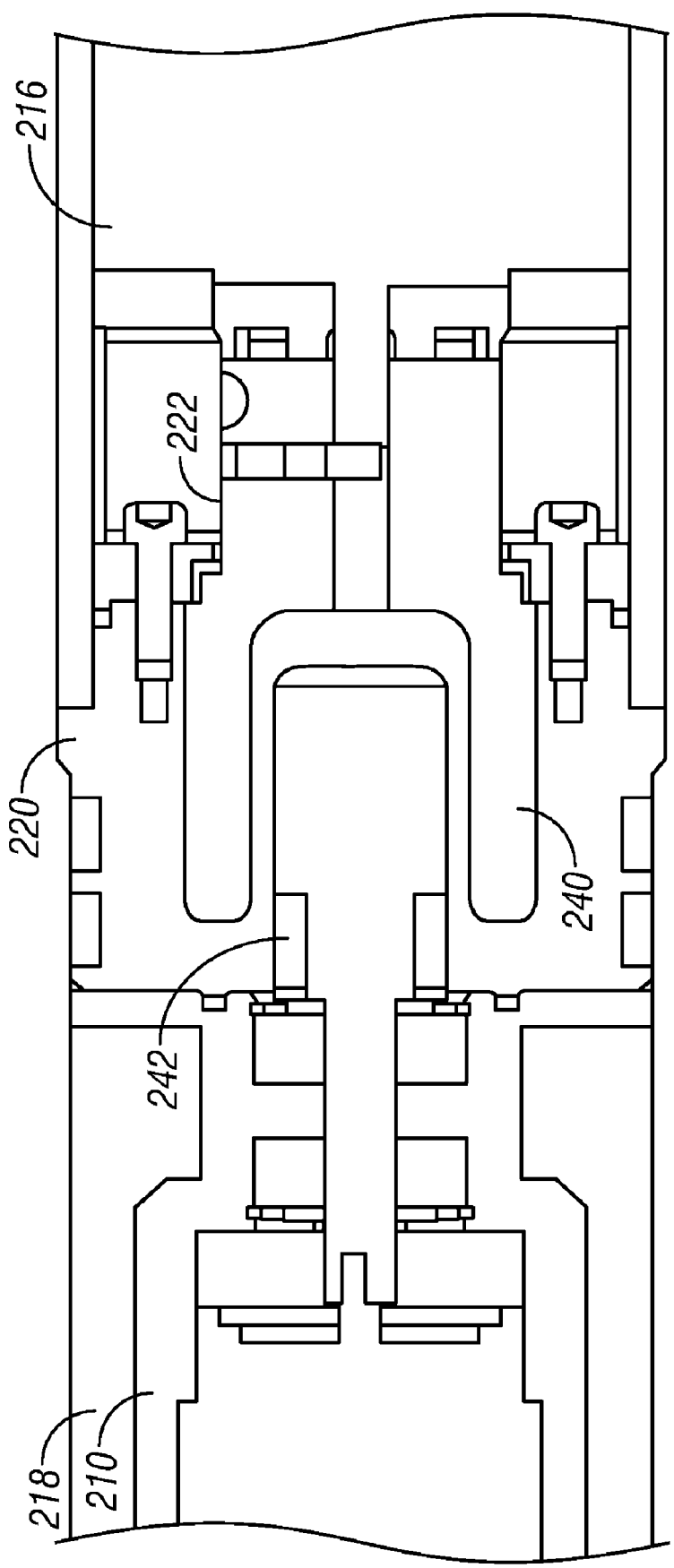
FIG. 3 is a schematic cross-sectional view of the FIG. 2 embodiment that shows the magnetic coupling in greater detail.

Referring now to FIG. 3, there is shown in greater detail the arrangement used to convey rotary power from the electric motor 206 (FIG. 2) to the drive train 208 (FIG. 2). In the non-limiting arrangement shown, the magnetic coupling 222 includes an outer section 240 positioned in the sealed section 216 and an inner section 242 positioned in the high-pressure section 218. Referring now to FIGS. 2 and 3, the outer section 240 is fixed to the electric motor 206 whereas the inner section 242 is fixed to the input side of the speed reducer/torque increaser 210. The electric motor 206 may be a DC motor or an A/C motor. The electric motor 206 may also be a reversible motor. Moreover, the sealed section 216 may be filled with a fluid that is at or near atmospheric. The speed reducer/torque increaser 210 converts the high rotary speed of the electric motor 206 into a torque of sufficient magnitude to displace the arm 204 via the shaft 214, ball screw 230, and mechanical linkage 226. The reaction forces caused by the arm 204 engaging an adjacent wall may cause an axial loading along the shaft 214, which is borne by the thrust bearing 212.

It should be appreciated that the transmission rotary power from the electric motor 206 to the shaft 214 does not necessarily require the use of seals along any portion of the rotary power transmission path. For instance, there are no seals along the shaft 214 or at the speed reducer/torque increaser 210 that encounter a pressure differential between a wellbore pressure and a low pressure environment associated with the sealed section 216. This pressure differential may be as great as to cause seals, if present, to apply a significant gripping force onto a rotating shaft. Advantageously, the elimination of such seals also eliminates the loss of rotary power and the loads imposed by such seals on the electric motor 206. In aspects, the elimination of such losses and loadings permit the electric motor 206 to operate at lower temperatures and permit the delivery of rotary power at sufficient magnitude to perform useful work even in high pressure and high temperature wellbore environments.

In embodiments, the tool assembly 200 may include one or more instruments 236 for investigating a surrounding formation. In one non-limiting arrangement, the instrument 236 may need physical contact with a casing wall or a wellbore wall during operation. This physical contact may be needed, for example, to acoustically couple an acoustic receiver to an adjacent formation. Thus, in one mode of operation, the actuator 202 is energized to extend the arm 204 outward to engage a wellbore wall and thereafter apply a force needed to radially displace the instrument 236 until the instrument 236 is pressed against the wellbore wall. Due to the physical contact with the wellbore wall, the instrument 236 may detect and measure acoustic energy in the adjacent formation.

It should be understood, however, that numerous other wellbore applications may also make use of the rotary power supplied by the electric motor 206. The advantages of the present disclosure may be obtained in those other applications as will apparent in the discussion below.

Figure 4:
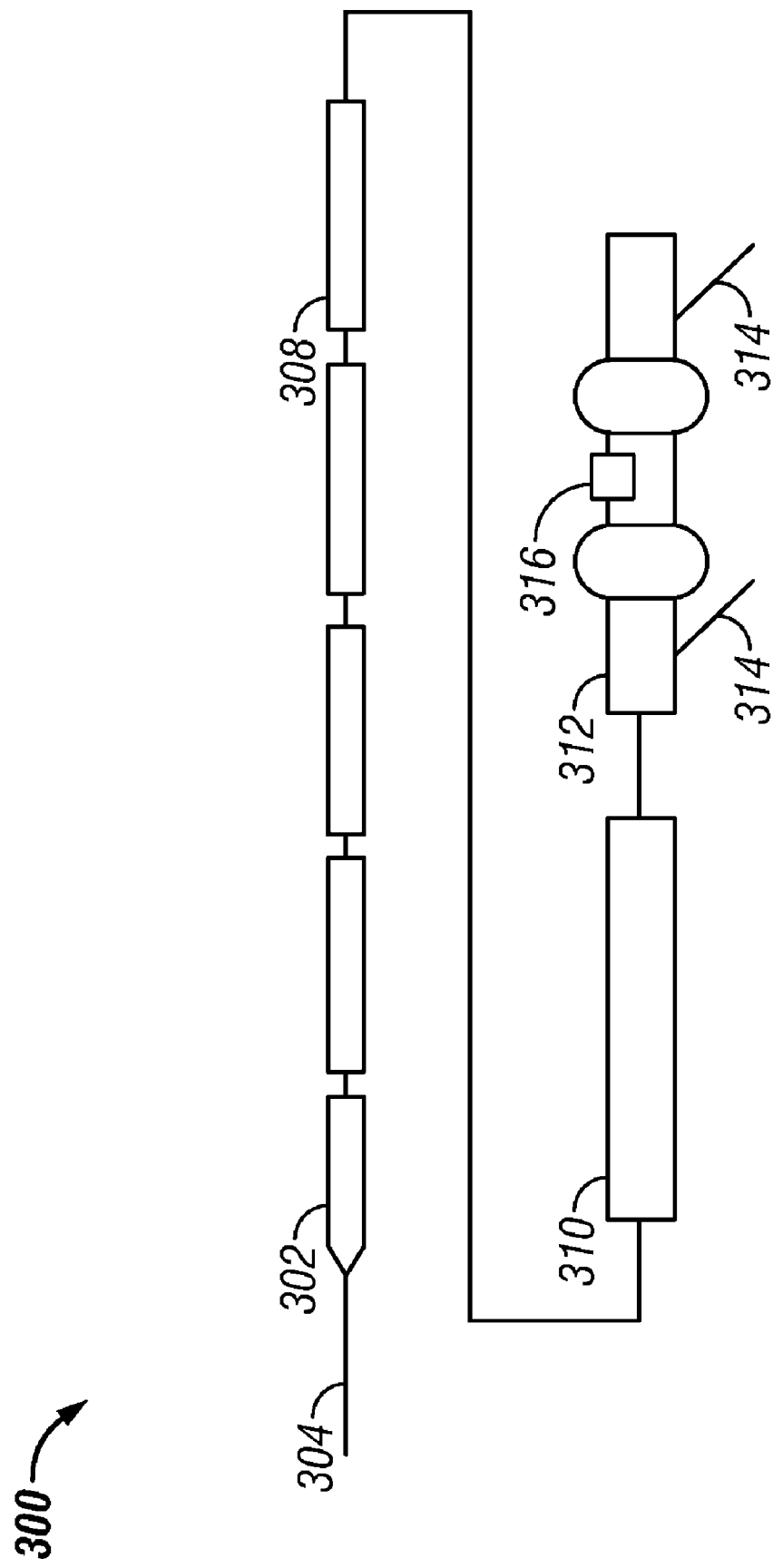
FIG. 4 is a schematic view of a formation sampling tool using a magnetic coupling in accordance with one embodiment of the present disclosure.

Referring now to FIG. 4, there is schematically illustrated one embodiment of a formation evaluation tool 300 for measuring one or more parameters of interest relating to the formation and/or the wellbore. The tool 300 may include a cable head 302 that connects to the wireline 304, an electronics module 308, a hydraulics module 310, and a formation testing module 312. The electronics module 308 may provide communication links with the surface and in situ control over the tool 300. The hydraulics module 310 may provide pressurized hydraulic fluid for hydraulically actuated components. The formation testing module 312 may be configured to retrieve and store fluid and/or core samples and, in embodiments, may include analysis tools that perform downhole testing on the retrieved samples. Moreover, the tool 300 can be configured as needed to accomplish specific desired operations and may house additional tools, such as survey tools, formation evaluation tools, reservoir characterization tools, etc. To radially displace the formation testing module 312, the module 312 may include upper and lower decentralizing arms 314. The arms 314 can be mounted on the body of module 314 by pivot pins (not shown) and may be configured to extend or retract during operation. In embodiments, an actuator similar to the actuator 40 as described in connection with FIG. 2 may be used to manipulate the arms 314. In one non-limiting arrangement, the formation testing module 312 may include a probe 316 or other device configured to engage or even penetrate a wellbore wall to retrieve a desired sample. Thus, in one mode of operation, an actuator (e.g., actuator 40 of FIG. 2) may be energized to extend the arm 314 outward to engage a wellbore wall and thereafter apply a force needed to radially displace the module 312 until the probe 316 is pressed against the wellbore wall. Thereafter, the arms 314 may hold the module 312 while the probe 316 retrieves the samples, which may be fluid samples or core samples. After sampling is complete, the actuator may be energized to retract the arms 314. In embodiments, the arms 314 may be biased to return to the retracted position once the actuator is deenergized.

Figure 5:
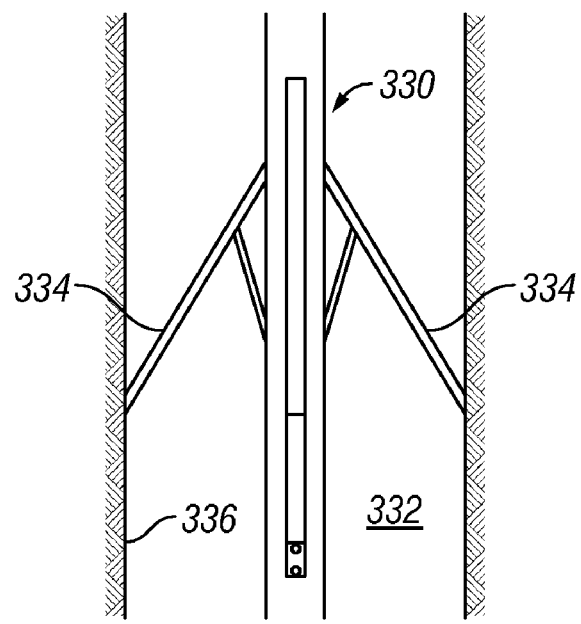
FIG. 5 is a schematic view of a caliper device using a magnetic coupling in accordance with one embodiment of the present disclosure.

In addition to radially displacing or positioning a tool or sensor, embodiments of the present disclosure may also utilize an actuator having a magnetic coupling as an operative component of the tool or sensor itself. Referring now to FIG. 5, there is schematically shown a wellbore caliper device 330 that may be deployed into a wellbore 332. The caliper device 330 may include known equipment to record wellbore geometry measurements and transmit the measurements to the surface. As shown, the device 330 may include one or more arms 334 that are configured to engage or contact a wellbore wall while the device 330 measures the diameter of the wellbore 332. The arms 334 may include a biasing element (not shown) that allows the arms 334 to deflect as needed to accommodate the changing diameters of the wellbore as well as to traverse discontinuities and or other obstructions in the wellbore. In one mode of operation, an actuator (e.g., actuator 40 of FIG. 2) may be energized to extend the arm 334 outward to engage a wellbore wall. Circuitry in the caliber device 330 may be used to monitor the movement of the arms 334 to determine the diameter of the wellbore 332. The actuator may be energized to retract the arms 334 or the arms 334 may be biased to a nominal retracted state. Additionally, the caliper device 330 may be either stationary or in motion while the measurements are being taken.

The above described embodiments may be ordinarily be utilized in connection with non-rigid carriers such as wirelines and slicklines. Embodiments of the present disclosure may also be utilized in the drilling and completion context as well. Illustrative embodiments are described below.

Figure 6:
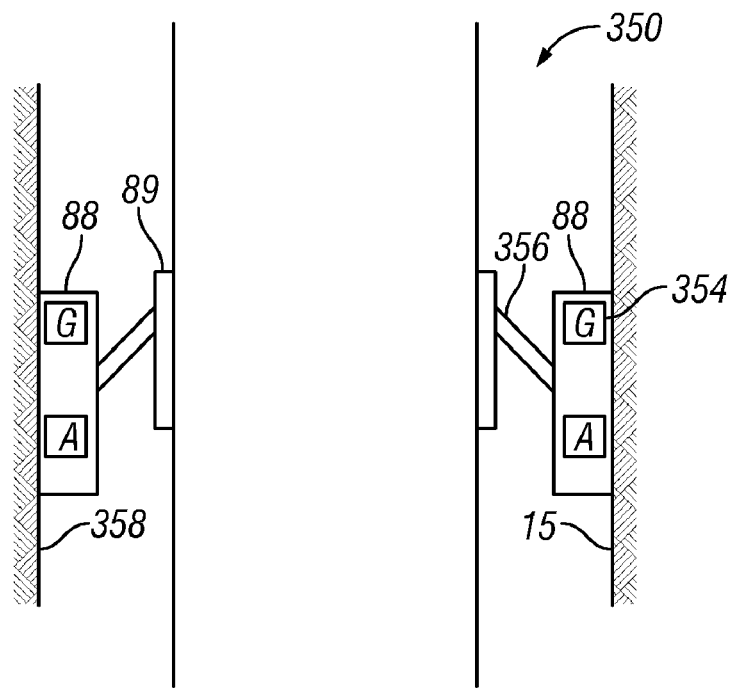
FIG. 6 is a schematic view of a formation evaluation tool conveyed along a drill string and that uses a magnetic coupling in accordance with one embodiment of the present disclosure.

Referring now to FIG. 6, there is shown a formation evaluation tool 350 that may be positioned along a drill string 352 configured to drill the wellbore. The tool 350 may includes sensors for measuring seismic energy (e.g., geophones G, hydrophones H, and accelerometers A) or any other sensor or device previously described. In one arrangement, sensors 354 that measure data via an acoustical path, the geophone G and the accelerometer A, may be positioned on arms or pads 356 that extend outward from the tool 350 into physical contact or engagement with a wellbore wall 358 such that the sensors 354 are acoustically coupled to the wellbore wall 358. In one mode of operation, an actuator (e.g., actuator 40 of FIG. 2) may be energized to extend the pads 356 outward to engage a wellbore wall in a manner previously described.

In addition to the positioning of tools, sensors and other devices that are configured to measure one or parameters relating to a formation or borehole, embodiments of the present disclosure may also be utilized in connection with devices that are apply force on a wellbore wall for other wellbore tasks.

Figure 7:
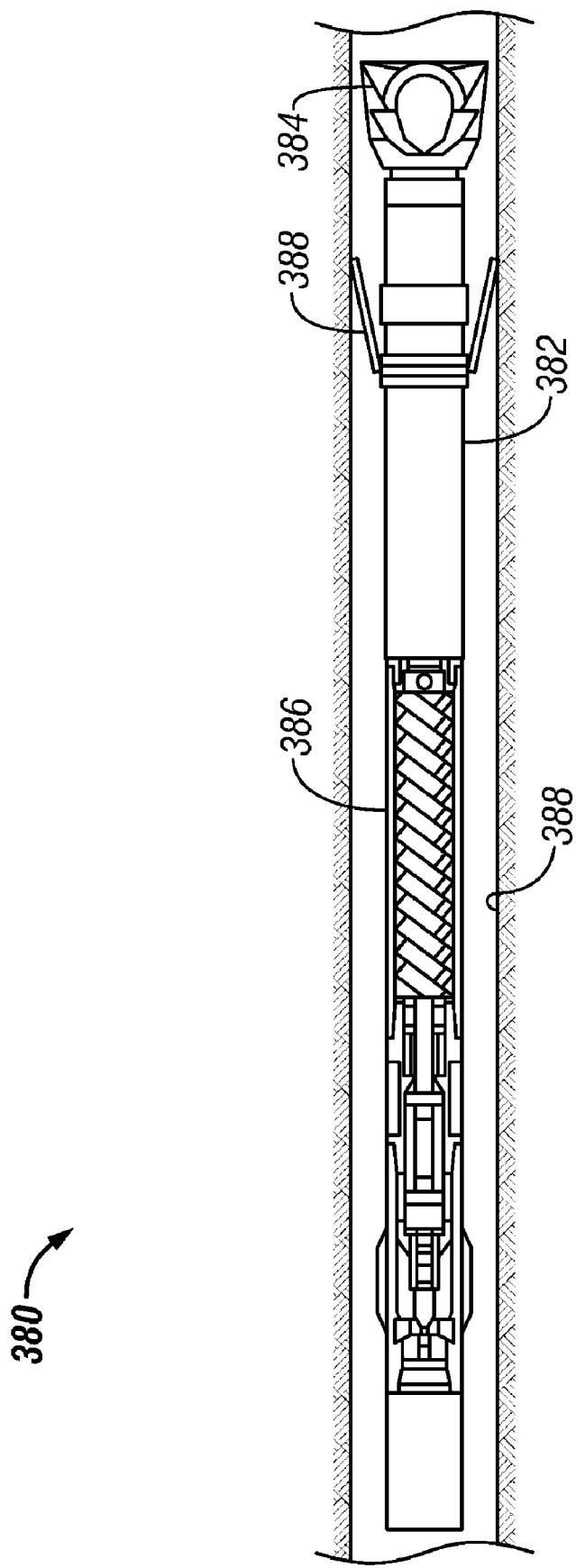
FIG. 7 is a schematic sectional view of a bottomhole drilling assembly that includes a steering device that uses a magnetic coupling in accordance with one embodiment of the present disclosure.

For example, referring now to FIG. 7, there is schematically illustrated an embodiment of a bottomhole assembly (BHA) 380 that uses a steering unit 382 for directional drilling. In one configuration, the BHA 380 may include a drill bit 384, and a drilling motor 386. The steering unit 382 may include a plurality of ribs or arms 388 that may be selectively actuated to apply a force against a wellbore wall. In embodiments, in a manner as previously described, the steering unit 382 may include a sealed electric motor and rotary transmission device that includes a magnetic coupling may be used to extend and retract the arm 388. Each arm 388 may have a separate sealed electric motor and rotary transmission device. Thus, each of the arms 388 may be independently controllable and independently adjustable. To steer the BAH 380 in a desired direction, a force vector to be applied by each of the arms 388 is first computed. Next, each actuator is energized to cause its respective arm 388 to extend a distance that generates the desired force vector. The combination of the side forces applied by the arms 388 will cause the drill bit 384 to drill in a desired direction.

In still other variants, embodiments of the present disclosure may also be utilized in connection with devices that use one or more rotating elements that perform tasks by engaging or contacting a wellbore object such as a wellbore wall or a wall of a wellbore tubular.

Figure 8:
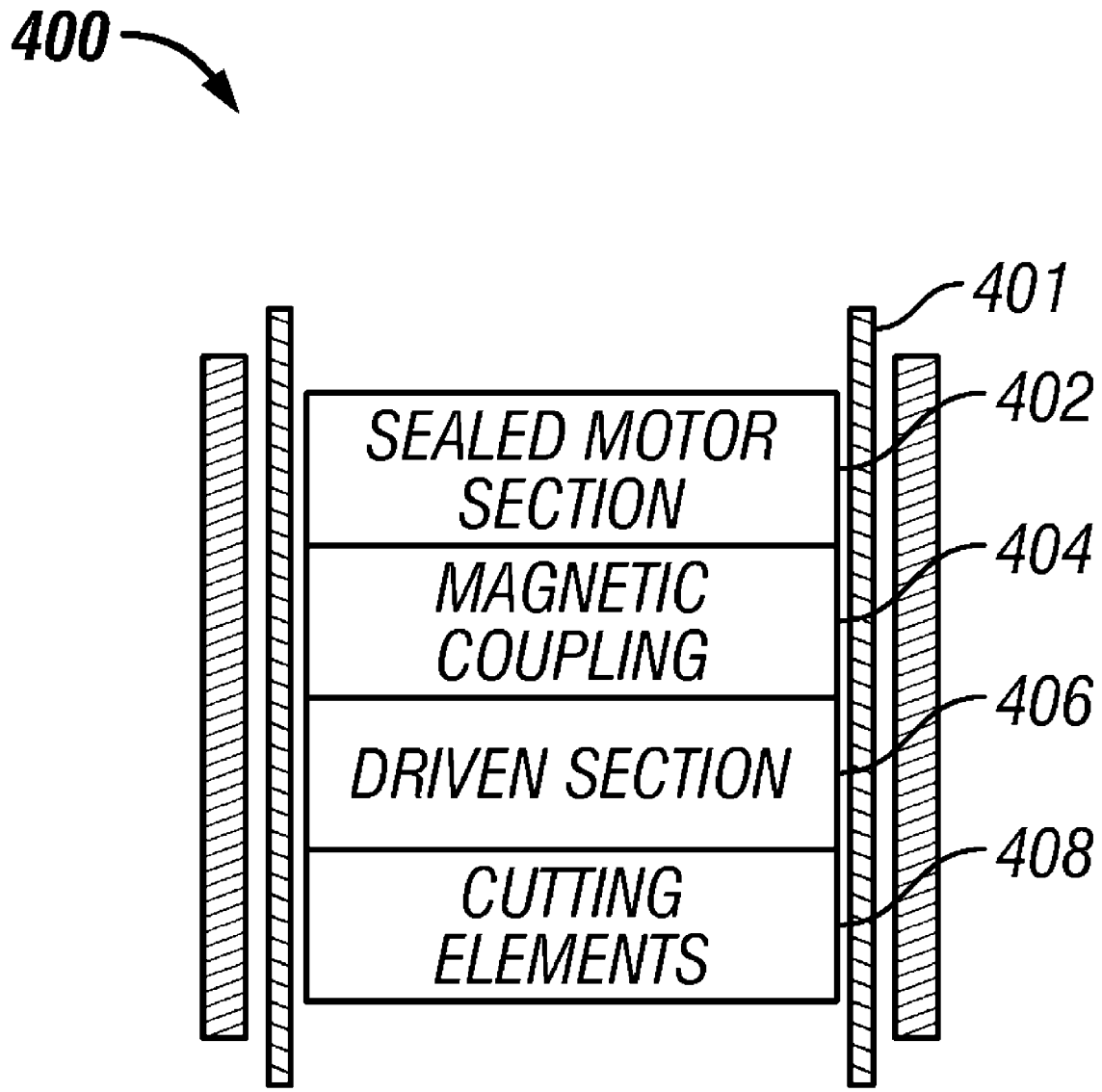
FIG. 8 is a functional block diagram of a cutting tool uses a magnetic coupling in accordance with one embodiment of the present disclosure.

For example, referring now to FIG. 8, there is illustrated in functional block diagram format an embodiment of a pipe cutter 400 for cutting a wellbore tubular 401. In one configuration, the pipe cutter 400 may include a sealed motor section 402, a magnetic coupling 404, a driven section 406, and one or more cutting elements 408. The cutting elements 408, which may be configured to cut metal, cement, or other materials that be in the wellbore, may be expandable; i.e., extend and retract. In a manner previously described, the use of the magnetic coupling eliminates the need for seals or other similar devices along the rotating elements of the driven section 406. Thus, any loading that would be caused by such seals on the motor are eliminated, which allows the motor to operate more efficiently. The sealed motor section 402 may include a sealed electric motor and the driven section 406 may include suitable shafts, bearings and other components for using the rotary power provided by the motor to rotate the cutting elements 408. Thus, in addition to aiding the transmission of rotary power to apply a force on a wellbore wall, embodiments of the present disclosure may be used to aid in transmitting rotary power to rotate cutting elements that cut wellbore tubulars, such as a casing, a drill pipe, a production tubular, a coiled tubing, or a liner.

In still other embodiments (not shown), an actuator having a magnetic coupling may be used in connection with deployment of a sensor. For example, the actuator may be coupled to a transducer or sensor positioned in a wellbore environment. The power source, such as an electric motor, may be positioned in a sealed or otherwise controlled environment. Advantageously, the magnetic coupling can transfer power across the pressure boundary between the wellbore environment and the sealed environment. The transferred power may be used to rotate or otherwise move the sensor. In addition to a sensor or transducer that measures parameters of interest, the transferred power may be used to operate sources or other devices that emit energy into a wellbore environment.

Thus, it should be appreciated that what has been described includes, in part, an apparatus for use in a wellbore in an earth formation that may include a tool body; a movable member associated with the tool body and that engages an object in the wellbore; an actuator operably coupled to the movable member, the actuator having a power section and a driven section; and a magnetic coupling magnetically connecting the power section to the driven section. The power section may include a sealed chamber; and the driven section may include a chamber in pressure communication with the wellbore. The movable member may include an arm configured to radially extend and retract. A sensor measuring a parameter of interest may be positioned on the arm and/or in the tool body. The power section may include an electric motor; and the driven section may include a speed reducer/torque increaser. The magnetic coupling may convey power across a pressure barrier. The movable member may include a cutting element. The object may be a wellbore wall, a casing, a production tubular, a liner, a drill string, and coiled tubing.

It should be also appreciated that what has been described includes, in part, a method for use in a wellbore in an earth formation. The method may include engaging an object in the wellbore using at least one movable member associated with a tool body; coupling an actuator to the at least one movable member, the actuator having a power section and a driven section; and magnetically connecting the power section to the driven section. The method may also include disposing an electric motor in a sealed chamber of the power section; and positioning a speed reducer/torque increaser in a chamber of the driven section that is in communication with the wellbore.

It should be further appreciated that what has been described includes, in part, a system for use in a wellbore in an earth formation that may include a conveyance device; a tool body coupled to the conveyance device; at least one movable member associated with the tool body, the at least one movable member being configured to engage an object in the wellbore; an actuator operably coupled to the at least one movable member, the actuator having a power section and a driven section; and a magnetic coupling magnetically connecting the power section to the driven section.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure.

What is claimed is:

1. An apparatus for use in a wellbore in an earth formation, comprising:
 (a) a tool body;
 (b) a movable member associated with the tool body, the movable member being configured to engage an object in the wellbore;
 (c) an actuator operably coupled to the movable member, the actuator having a power section and a driven section; and
 (d) a magnetic coupling magnetically connecting the power section to the driven section to convey power from the power section to the driven section across a pressure barrier.

2. The apparatus according to claim 1 wherein the power section includes a sealed chamber; and the driven section includes a chamber in pressure communication with the wellbore.

3. The apparatus of claim 1 wherein the movable member includes an arm configured to radially extend and retract.

4. The apparatus according to claim 3 further comprising a sensor configured to measure a parameter of interest, the sensor being positioned on the arm.

5. The apparatus according to claim 1 further comprising a sensor configured to measure a parameter of interest, the sensor being positioned in the tool body.

6. The apparatus according to claim 1 wherein the power section includes an electric motor; and the driven section includes a speed reducer/torque increaser.

7. The apparatus of claim 1 wherein the movable member includes a cutting element.

8. The apparatus of claim 1 wherein the object is one of (i) a wellbore wall, (ii) a casing, (iii) a production tubular, (iv) a liner, (v) drill string, and (vi) coiled tubing.

9. A method for use in a wellbore in an earth formation, comprising:
 engaging an object in the wellbore using a movable member associated with a tool body;
 coupling an actuator to the movable member, the actuator having a power section and a driven section; and
 magnetically connecting the power section to the driven section to convey power from the power section to the driven section across a pressure barrier.

10. The method according to claim 9 further comprising: forming a sealed chamber in the power section; forming a chamber in the driven section that is in pressure communication with the wellbore.

11. The method according to claim 10 further comprising disposing an electric motor in the sealed chamber; and positioning a speed reducer/torque increaser in the chamber of the driven section.

12. The method according to claim 9 further comprising positioning on an extensible arm a sensor configured to measure a parameter of interest.

13. The method according to claim 9 further comprising positioning in the tool body a sensor configured to measure a parameter of interest.

14. The method of claim 9 further comprising positioning a cutting element on the movable member.

15. The method according to claim 9 wherein a magnetic coupling conveys power across a pressure barrier between the power section and the driven section.

16. The method of claim 9 wherein the object is one of (i) a wellbore wall, (ii) a casing, (iii) a production tubular, (iv) a liner, (v) drill string, and (vi) coiled tubing.

17. A system for use in a wellbore in an earth formation, comprising:
 a conveyance device;
 a tool body coupled to the conveyance device;
 a movable member associated with the tool body, the movable member being configured to engage an object in the wellbore;
 an actuator operably coupled to the movable member, the actuator having a power section and a driven section; and
 a magnetic coupling magnetically connecting the power section to the driven section to convey power from the power section to the driven section across a pressure barrier.

18. The system according to claim 17 wherein the power section includes a sealed chamber; and the driven section includes a chamber in pressure communication with the wellbore.

19. The system according to claim 18 wherein the power section includes an electric motor disposed in the sealed chamber; and the driven section includes a speed reducer/torque increaser in the chamber.

* * * * *